United States Patent [19]

Sun

[11] 4,218,224
[45] Aug. 19, 1980

[54] METHOD FOR CONTROLLING THE REGENERATION AND DESORBTION OF AN ABSORBENT MATERIAL

[75] Inventor: Yun C. Sun, Midland, Mich.

[73] Assignee: The Dow Chemical Company, Midland, Mich.

[21] Appl. No.: 775,134

[22] Filed: Mar. 7, 1977

Related U.S. Application Data

[63] Continuation-in-part of Ser. No. 640,129, Dec. 12, 1975, abandoned.

[51] Int. Cl.² ............................................. B01D 53/04
[52] U.S. Cl. .......................................... 55/20; 55/62; 55/74
[58] Field of Search .................. 55/20, 33, 59, 62, 67, 55/74, 267, 387, 389; 141/52, 287, 290; 220/85 VR, 85 VS

[56] References Cited

U.S. PATENT DOCUMENTS

| | | | |
|---|---|---|---|
| 3,109,486 | 11/1963 | Hansen | 55/20 X |
| 3,338,029 | 8/1967 | Warfield, Jr. | 55/20 |
| 3,468,103 | 9/1969 | Hergt | 55/387 X |
| 3,748,829 | 7/1973 | Joyce et al. | 55/387 X |
| 3,776,283 | 12/1973 | Kramer et al. | 55/387 X |
| 3,881,894 | 5/1975 | Onufer | 55/387 X |
| 3,897,193 | 7/1975 | Kattan et al. | 55/387 X |

*Primary Examiner*—Robert H. Spitzer
*Attorney, Agent, or Firm*—G. R. Baker

[57] ABSTRACT

A method for controlling the regeneration (desorbtion) of an absorbent material, i.e., an adsorbent bead or particle, for hydrocarbon vapors vented from confined spaces during periods of liquid fluctuations in the confined zone or for hydrocarbon vapors vented from within said zone which vapors are deliberately generated, or as a result of heating and cooling the confined spaces as a result of exposure to atmospheric temperature fluctuations of the confined space. The method is accomplished by providing a bed of absorbent material for said vapors in vapor communication with the vent of the confined space(s) as well as in communication with the opposite end of the fluid path through said bed to the ambient atmosphere, providing a pair of thermocouples and associated control mechanisms, one thermocouple at each end of said bed, and a valve controllable by each associated control mechanism for controlling the delivery of steam to the ambient atmosphere side of the bed, one thermocouple being calibrated to cause its associated control mechanism to open the valve controlling the steam to heat the air entering the bed from the ambient atmosphere when air is required to pass through the bed from the ambient atmosphere, the other thermocouple being calibrated to override the first thermocouple to control the steam valve when the temperature of the air and desorbed vapors reaches a predetermined temperature–the entire control system being inactive when no air or vapor is flowing.

1 Claim, No Drawings

METHOD FOR CONTROLLING THE REGENERATION AND DESORBTION OF AN ABSORBENT MATERIAL

CROSS-REFERENCE TO RELATED APPLICATION

This application is a continuation-in-part of our copending application Ser. No. 640,129, filed Dec. 12, 1975, now abandoned.

BACKGROUND OF THE INVENTION

Because of the recognition that many hydrocarbon vapors are undesirable pollutants to the ambient atmosphere, the increased value of lost hydrocarbons because of the increased cost of the raw materials and labor associated with their obtention, and the fact that some of the hydrocarbons are suspected carcinogens, it has become technically and environmentally sound to develop processes for preventing loss of these hydrocarbons to the ambient atmosphere. One of the most recent technologies suggested for preventing the loss of vapors to the ambient atmosphere is the use of beds of micro- or macroporous ethylenically backboned polymers, most having a relatively high degree of crosslinking and either phenyl, modified phenyl, acrylic or modified acrylic moieties extending from the backbone, i.e. styrene divinylbenzene copolymers, polyacrylic or methacrylic polymers with or without styrene divinyl benzene and the like. These absorbent materials are stable under the absorption and desorbtion conditions and, in most instances, do not lose their absorbent characteristics on desorbtion as carbon so often does.

While these polymers and carbon both absorb hydrocarbon vapors and the polymers readily desorb most hydrocarbons, both are subject to static electrical charge build-up when warm or hot air is used as the sole desorbing media. The use of steam to desorb the beds results in a satisfactory desorbtion of the bed but introduces large quantities of condensate into the storage tank. Separate condensing and water separators are economically disadvantageous and result in loss of desorbed liquids. The use of mixtures of steam and air or inert gases result in losses of sorbed material because the input of air and steam into large tanks requires venting of the tank to the atmosphere, defeating the purpose of the recovery system.

Therefore, it is an object of the present invention to provide a process for sorbing and desorbing vapors of volatile hydrocarbons under conditions which are safe and efficacious.

BRIEF DESCRIPTION OF THE INVENTION

In accordance with the present invention a hydrocarbon vapor recovery unit comprises a bed of hydrocarbon vapor absorbent such as a styrene divinylbenzene copolymer of greater than about 5% to about 40% divinylbenzene or an acrylic acid or acrylic ester-styrene copolymer and is provided with piping communicating one end of the bed to the vent of a confined space containing vapors of a hydrocarbon which is subject to volume fluctuations, e.g., a storage tank for liquid hydrocarbon, and at the bed's other end, with a vent to the ambient atmosphere. The bed is also provided with a source of steam at the ambient air end. The steam flow is controlled by two thermocouples and their associated control mechanisms through activation of a valve in the steam source line. The thermocouple at the ambient air end of the bed provides the signal to activate the opening of the steam valve when ambient air is drawn into the bed as a result of a decrease in the pressure of the vapor over the fluid or liquid in the storage tank. The steam heats the air and the bed to between about 35° to 100° C. The predetermined temperature of the bed, heated air and desorbed vapors having reached a temperature within the range of 35°–100° C., the thermocouple at the tank side of the bed overrides the first thermocouple and adjusts the valve to maintain the desired temperature of the vapor and air and steam leaving the bed into the confined space. Upon the buildup of pressure inside the tank due to the inflow of air, desorbed vapor and steam, equilibrium with the ambient atmosphere is achieved and the flow of air into the system ceases. When this occurs the thermocouple at the tank side of the bed substantially closes the steam valve and the entire system achieves an ambient atmosphere condition. The thermocouples do not operate when air is flowing out since the tank side thermocouple does not open the steam valve and the steam escaping at the vent from the substantially closed valve is sufficient to maintain the temperature of the vent thermocouple at or above the preset maximum, thus not permitting the valve to be opened. The following schematic diagram more clearly illustrates the simplicity of the present invention:

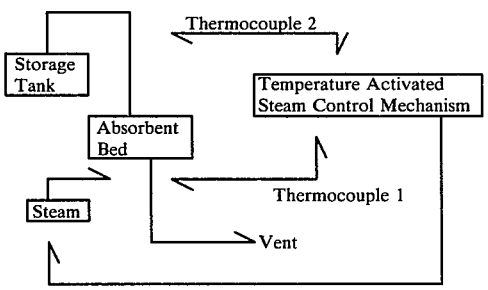

DETAILED DESCRIPTION OF THE INVENTION

A vent from a 60,000 gallon benzene storage tank which is filled each day during an 8 hour period and emptied each day over a 16 hour period was connected to a 2000 lb. bed of styrene divinylbenzene beads which vented to the ambient atmosphere. The tank normally vented 160 pounds of benzene vapor per 24 hour period. The bed was provided with a steam inlet which was located in the exit side and directed to the exit side. A motorized valve in the steam line was connected to a thermocouple on the tank side of the bed and to a thermocouple at the exit side of the bed on the ambient side of the steam introduction point. The steam line valve was cracked open to insure the outlet (exit) from the bed to the ambient atmosphere was warmer than the other end of the bed. The thermocouples were set to at about 60° C. at the tank end of the bed and 35° C. at the exit. Therefore, during filling of the tank and thus venting of vapors from the tank as it filled did not activate the opening of the steam valve. However, during draining of the tank ambient air was drawn into the tank through the bed. The ambient air entering caused the thermocouple at the ambient end to activate the steam valve and cause steam to contact the air raising its temperature. The so-heated air passed through the bed warming the bed and stripping the bed of the absorbed benzene vapors. Upon the air vapor mixture reaching about 60° C. the thermocouple in the side of the bed connected to the tank shut the steam valve to reduce the flow of steam. The incoming air is still heated by the steam but, of course, not as rapidly, thus the air vapor mixture can be maintained at about 60° C. during the desorbing cycle. When no further air is taken into the tank, the thermocouple at the ambient air end shuts the steam off leaving only a slightly cracked valve. The bed operated in this manner recovered all of the benzene vented as indicated by GPC Analysis of the vent from the bed. The bed never became overloaded during several weeks of operation as evidenced by no breakthrough of benzene as indicated by GPC Analysis of the vent from the bed. Such operation indicates the return of the absorbed vapors since, if not desorbed, the bed would soon become loaded to capacity and pass benzene to the atmosphere.

What is claimed is:

1. A method for controlling the regeneration of a hydrocarbon absorbing resin bed associated with a storage tank or container, which bed adsorbs the vapors exiting from a tank vent during periods of influx of liquid hydrocarbon into said tank and which desorbs the vapors from the bed during periods of influx of ambient air into the tank during periods of hydrocarbon liquid out-flow or during periods of cooling of the tank and contents, which method comprises:

(a) providing a bed of hydrocarbon absorbent resin beads or particles, one end of said bed being in fluid communication with the vent of a hydrocarbon storage tank or container, the other end being in fluid communication with the ambient atmosphere;
   (b) providing a source of steam to a valve and from said valve to the ambient atmosphere side of said bed;
   (c) providing a thermocouple at each end of said bed, each electrically or pneumatically jointly controlling the valve of said steam source;
   (d) calibrating said ambient air side thermocouple to respond to the intake of air from the ambient atmosphere into said bed to activate open the valve of said steam source to heat said air to between about 35° and about 100° C., calibrating said other thermocouple to reduce or shut said valve when the temperature of the air and desorbed vapors from said bed passing said thermocouple into said storage tank reach its predetermined temperature between about 35° and about 100° C.

* * * * *